United States Patent [19]

Schmid

[11] Patent Number: 5,496,100
[45] Date of Patent: Mar. 5, 1996

[54] PRESSURE LIMITED SOLENOID VALVE FOR A BRAKE SYSTEM

[75] Inventor: Otto Schmid, Fischen, Germany

[73] Assignee: Robert Bosch GmbH, Stuttgart, Germany

[21] Appl. No.: 244,933

[22] PCT Filed: Sep. 18, 1993

[86] PCT No.: PCT/DE93/00886

§ 371 Date: Jun. 15, 1994

§ 102(e) Date: Jun. 15, 1994

[87] PCT Pub. No.: WO94/08831

PCT Pub. Date: Apr. 28, 1994

[30] Foreign Application Priority Data

Oct. 15, 1992 [DE] Germany ............ 42 34 749.1

[51] Int. Cl.$^6$ .................................. B60T 8/36
[52] U.S. Cl. ............. 303/119.2; 251/80; 251/129.19; 251/129.2
[58] Field of Search ............... 303/84.1, 84.2, 303/119.2, 116.2; 251/80, 83, 129.19, 129.2

[56] References Cited

U.S. PATENT DOCUMENTS

| | | | |
|---|---|---|---|
| 2,296,132 | 5/1939 | Wiseley | 251/80 X |
| 3,818,927 | 6/1974 | Zeuner | 137/110 |
| 4,526,203 | 7/1985 | Leiber | 303/119.2 X |
| 5,318,066 | 6/1994 | Burgdorf et al. | 251/83 X |

FOREIGN PATENT DOCUMENTS

| | | |
|---|---|---|
| 0232783 | 8/1987 | European Pat. Off. . |
| 0492109 | 7/1992 | European Pat. Off. . |
| 1096559 | 6/1955 | France . |
| 2507280 | 12/1982 | France . |
| 3609340 | 9/1987 | Germany . |
| 4129638 | 3/1993 | Germany . |
| 885678 | 11/1981 | U.S.S.R. .................. 251/129.19 |

Primary Examiner—Robert J. Oberleitner
Assistant Examiner—Lee W. Young
Attorney, Agent, or Firm—Edwin E. Greigg; Ronald E. Greigg

[57] ABSTRACT

A solenoid valve with pressure limitation for motor vehicle brake systems with slip control. The solenoid valve has a seat valve with the valve seat, valve element and restoring spring, which holds the seat valve in an open position. The valve element is fastened on a valve tappet, which is axially displaceable in a valve housing and is transferred into a seat-valve-closed position by an electromagnet when the electromagnet is supplied with current. In the valve-closed position, there acts a pressure-limiting spring, which fixes the valve-opening pressure of the seat valve. To achieve a structurally simple valve design with the advantage of simple and accurate setting and adjustment and also of simplified forward assembly of the solenoid valve, the valve tappet is subdivided into first and second tappet elements which are coaxial to each other and relatively displaceable, of which the first tappet element bears the valve element and the second tappet element can be driven by the electromagnet. The pressure-limiting spring is supported between the first and second tappet elements.

13 Claims, 2 Drawing Sheets

ID VALVE
PRESSURE LIMITED SOLENOID VALVE FOR A BRAKE SYSTEM

PRIOR ART

The invention is based on a solenoid valve with a pressure limitation for motor vehicle brake systems with slip control.

In the case of an already proposed solenoid valve of this type (German Patent Application P 41 29 638.9), the valve tappet is guided at its front end, bearing the valve element designed as a ball, in a guide sleeve fastened in the valve housing. The restoring spring, acting in the opening direction of the solenoid valve, is supported as a helical compression spring on the one hand against the guide sleeve and on the other hand, on the side facing away from the valve element, against the valve tappet. The pressure-limiting spring is arranged in a bore in the armature of the electromagnet, which bore is coaxial to the valve tappet, and is supported as a helical compression spring against a spring plate which is movable in the armature. The spring plate can be pressed on the one hand against the end face of the valve tappet facing away from the valve element and on the other hand against a stop provided on the armature. If the electromagnet is excited, the armature is attracted, as a result of which the pressure-limiting spring acts on the valve tappet, which is movable in relation to the armature, and displaces the said tappet against the force of the restoring spring in the direction of the valve seat and sets the valve element onto the valve seat. The force pressing the valve element onto the valve seat, which force determines the opening pressure of the solenoid valve in the closing position of the latter, is dependent on the bias or rating of the pressure-limiting spring and of the restoring spring.

ADVANTAGES OF THE INVENTION

The solenoid valve according to the invention has the advantage that, due to the shifting, according to the invention, of the pressure-limiting spring out of the armature of the electromagnet into the valve tappet and the associated elimination of the coaxial bore in the armature for receiving the pressure-limiting spring, a greater armature pole face is available and consequently a greater magnetic force is available with an electromagnet of the same rating. The stop face of the armature on the valve housing can be designed optimally with respect to the radius of a capsule which is held on the valve housing and receives the armature, in order to avoid capsule ruptures under continuous stress.

The solenoid valve according to the invention has a simple structural design and can be set and adjusted much more simply and accurately. By virtue of its type of design, it can be assembled in a forward assembly, assembly and setting proceeding sequentially. This saves assembly time and helps to conserve assembling and operating means.

Advantageous further developments and improvements of the solenoid valve are possible by the measures set out hereinafter.

In a preferred embodiment of the invention, the valve seat is formed on a valve body press-fitted in a sleeve-shaped valve housing. Of the valve tappet designed in two parts, the tappet element which can be driven by the electromagnet is guided axially in the valve housing and is of an at least partially hollow-cylindrical design, the other tappet element, bearing the valve element, being accommodated axially displaceably in the hollow-cylindrical tappet element. The restoring spring is supported between the valve body and the hollow-cylindrical tappet element and brings the latter to bear against an armature of the electromagnet, while the pressure-limiting spring, arranged between the tappet elements, brings the tappet element bearing the valve element to bear against a stop formed on the hollow-cylindrical tappet element. Due to these design measures, the setting of the opening pressure is governed only by the pressure-limiting spring and not, as in the case of the known solenoid valve, also in addition by the restoring spring. The spring setting can consequently take place more accurately and can be reproduced better. Together with the better-defined stop faces of the armature on the valve housing, variations in the zeroing of the tappet lift, previously occurring during the spring setting performed by means of a measuring device, are avoided and the influence of the actual residual air gap is balanced out.

BRIEF DESCRIPTION OF THE DRAWINGS

The invention is explained in more detail in the following description with reference to exemplary embodiments represented in the drawing, in which.

DESCRIPTION OF THE EXEMPLARY EMBODIMENTS

Figure 1:
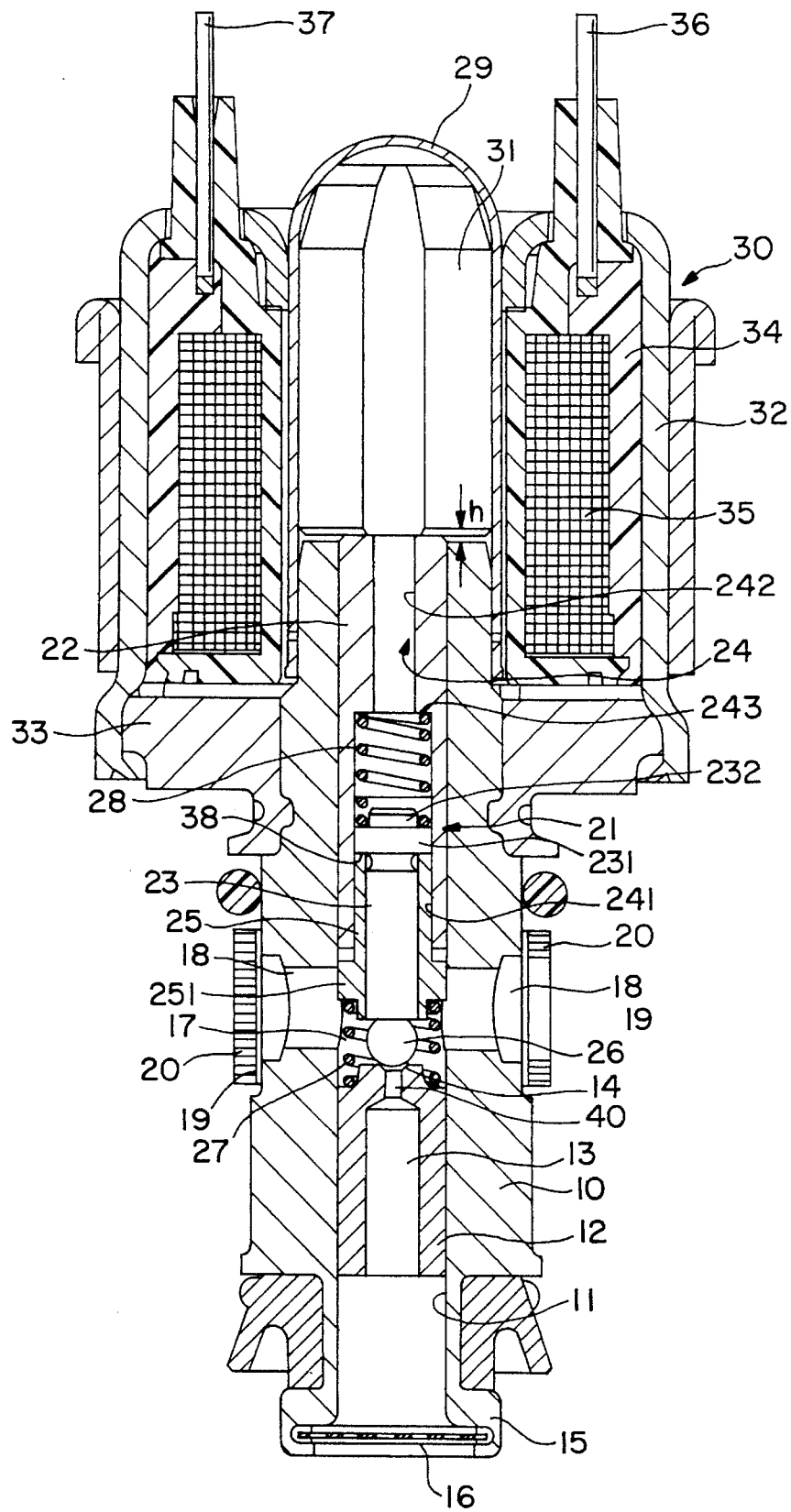
FIGS. 1 and 2 each show a longitudinal section of a solenoid valve with pressure limitation for motor vehicle brake systems according to a first exemplary embodiment and second exemplary embodiment, respectively.

The solenoid valve with pressure limitation, represented in longitudinal section in FIG. 1, is used in motor vehicle brake systems with slip control, such as antilock systems and/or traction-slip control. It has a valve housing 10 with a longitudinal bore 11, in which a valve body 12 is press-fitted. The valve body 12 is provided with an inflow channel 13, which is encircled at the one end face of the valve body 12 by a valve seat 14 formed on the valve body 12. The inflow channel 13 is in connection at the other end face of the valve body 12 with a connection stub 15, which is covered by a filter 16. The valve body 12 adjoins a valve chamber 17, from which there extend radially running outflow channels 18, which in each case open out to a tube-like shaped filter 19, which is fixed in relation to the valve housing 10 by a filter mount 20.

Guided axially displaceably in the longitudinal bore 11 is a two-part valve tappet 21, which is subdivided into two coaxial tappet elements 22, 23 which can be displaced in relation to each other. The tappet element 22 has a stepped bore 24 passing longitudinally through it, with a bore section 241 of larger diameter and a bore section 242 of smaller diameter, an annular shoulder 243 being formed at the transition of the bore sections 241 and 242. The hollow-cylindrical tappet element 22 with the stepped bore 24 is guided axially displaceably in the longitudinal bore 11 of the valve housing 10, while the tappet element 23 of a pin-shaped design is guided axially displaceably in a tappet guide bush 25, which is press-fitted into the bore section 241 of larger diameter in the tappet element 23. The tappet guide bush 25 is in this case inserted from the end face of the tappet element 22 facing the valve body 12 and protrudes beyond the end face of the said tappet element. In the protruding region, the tappet guide bush 25 is provided with an integral annular collar 251, which projects radially beyond the bush diameter and, for additional guidance, may be formed in the bore section 241 of larger diameter.

The pin-like tappet element 23, guided axially displaceably in the bore section 241 of larger diameter in the tappet element 22, bears on its end face facing the valve body 12 a valve element 26 which is designed as a ball and interacts with the valve seat 14 on the valve body 12 for releasing and closing the valve opening 40 formed at the mouth of the inflow channel 13. Between the valve body 12 and the tappet guide bush 25, press-fitted into the tappet element 22, there is supported a restoring spring 27, which is designed as a helical compression spring, acts in the valve-opening direction and keeps the valve element 26 lifted-off from the valve seat 14, so that there is a connection from the inflow channel 13 to the outflow channels 18. As readily evident, the valve formed by the valve body 12 with valve seat 14 and valve element 26 as well as restoring spring 27 is a seat valve which is open in the basic position or position of rest, is actuated electromagnetically by means of the valve tappet 21 and has a pressure-limiting function due to further design measures, described below.

The tappet element 23, guided axially displaceably in the tappet guide bush 25 and projecting with the valve element 26 forwards beyond the tappet guide bush 25, also projects beyond the other end face of the tappet guide bush 25 and bears here an annular collar 231, protruding radially away beyond the end face of the tappet guide bush 25. Against the annular collar 231 and against the annular shoulder 243 in the stepped bore 24 there is supported a pressure-limiting spring 28, which is designed as a helical compression spring and is centered on a section 232 of the tappet element 23 projecting axially beyond the annular collar 231.

Set onto the end of the valve housing 10 facing away from the seat valve there is a capsule 29, in which an armature 31 of an electromagnet 30 is guided axially displaceably with small lift. The electromagnet 30 itself concentrically surrounds the armature 31 and the end of the valve housing 10 facing the latter with a pot-shaped magnet housing 32, the end face of which is covered by an annular plate 33 held in an annular groove of the valve housing. In the interior of the magnet housing 32 there is held in a coil former 34 an annular excitation coil 35, which concentrically surrounds the armature 31 and the end of the valve housing 10 facing the latter. The excitation coil 35 can be connected via two electrical terminals 36, 37 to a voltage source. In the basic position or position of rest of the solenoid valve shown in FIG. 1, the excitation coil 35 is not supplied with current and the seat valve is open due to the restoring spring 27. The valve tappet 21 projects with its tappet element 22 somewhat beyond the end face of the valve housing 10 and, due to the restoring spring 27, comes to bear against the armature 31, which as a result is in turn pressed against a stop in the capsule 29, the lift distance h being established between the armature faces and the end face of the valve housing 10. The annular collar 231 on the tappet element 23 bears under the action of the pressure-limiting spring 28 against a stop 38, formed by the end face of the tappet guide bush 25, in the tappet element 22, the valve element 26 lying in front of the valve seat 14 on the valve body 12 by an equal or slightly smaller lift.

If the electromagnet 30 is supplied with current, the magnetic force acting between the valve housing 10 and the armature 31 causes the latter to be moved in the direction of the valve housing 10, until, after the lift h, it strikes against the annular end face of the valve housing 10. In this case, the tappet element 22 brought to bear by the restoring spring 27 against the armature 31 is likewise moved by the lift h in the direction of the valve body 12, as a result of which the tappet element 23 held by the pressure-limiting spring 28 against the stop 38 is taken along and the valve element 26 is set onto the valve seat 14 on the valve body 12. The valve element 26 is from then on held in the closed position by the pressure-limiting spring 28. If the electromagnet 10 remains supplied with current, the opening pressure of the seat valve is determined exclusively by the rating of the pressure-limiting spring 28. If the displacing force generated by the pressure in the inflow channel 13 on the valve element 26 exceeds the spring force of the pressure-limiting spring 28 acting on the valve tappet 21, the valve element 26 is lifted off the valve seat 14, and pressure medium can flow via the opened seat valve to the outflow channels 18.

The solenoid valve described is of a structurally simple design and can be set and adjusted in a simple manner. It is put together in so-called forward assembly, assembly and setting proceeding sequentially. To be specific, the assembly of the solenoid valve takes place as follows:

The valve body 12 is initially pressed in from below in FIG. 1 into the valve housing 10 to a first, too small setting dimension, the pressing movement taking place from underneath upwards. The valve tappet 21 is put together from the tappet elements 22 and 23 with pressure-limiting spring 28 and the tappet guide bush 25 arranged in between as a preassembled and preadjusted structural unit. In this case, the bias of the pressure-limiting spring 28 is predetermined by the tappet guide bush 25 being pushed in to a greater or lesser depth. Once the necessary bias has been achieved, the tappet guide bush 25 is fixed axially nondisplaceably in the tappet element 22.

The opening or restoring spring 27 is introduced from above into the longitudinal bore 11 of the valve housing 10, and so too is the valve tappet 21, preassembled as a structural unit. In this case, the valve tappet 21 disappears completely in the valve housing 10. Then the valve tappet 21 is pressed downwards from above by an assembly tool, designed as a jig pin, until the valve element 26 rests on the valve seat 14 of the valve body 12. In this assembly step, the assembly tool acts exclusively on the tappet element 22. The pushing-in force of the assembly tool is in this case chosen such that the restoring spring 27 is overcome, but the tappet element 23, which is axially displaceable in the tappet element 22, is not displaced. This is readily possible since the force of the restoring spring 27 is rated as 3 N in the exemplary embodiment and the force of the pressure-limiting spring 28 is rated as something of the order of 4.5–8 N in the exemplary embodiment. Then the valve body 12 is further pressed from below upwards beyond the first setting dimension, which has the consequence that the valve tappet 21 also moves upwards against the sprung assembly tool. The latter is fixed until the valve tappet 21 projects with its upper end face by a predetermined setting dimension, for example 0.05–0.1 mm, beyond the upper end face of the valve housing 10. This projecting dimension of the valve tappet 21 or of the tappet element 22 beyond the valve housing 10 corresponds to the predetermined valve tappet lift h.

For lift setting, the capsule 29, into which the armature 31 is inserted, is aligned with respect to the valve housing 10 and pressed with the aid of a pressing device by a first amount of displacement beyond the valve housing 10. By means of an auxiliary coil which can be supplied with current, the armature 31 is brought to bear against the valve housing 10. A displacement-measuring sensor is introduced through the inflow channel 13 and the valve body 12 and raised until it reaches the valve element 26. This is the zero position of the displacement-measuring sensor. Once the zero position has been established, the supply of current to the auxiliary coil is ended. After ending the supply of current, the restoring spring 27 raises the armature 31. The capsule 29 is then further pressed downwards in FIG. 1 by a further amount of displacement, until the displacement-measuring sensor indicates a distance from the zero position of the valve element 26, that is to say relative to the valve seat 14, which corresponds to the desired valve lift. Then the auxiliary coil and displacement-measuring sensor are removed. By welding the capsule 29 to the valve housing 10, their position is fixed. Thereafter, the magnet housing 32 with annular coil 35 is pushed axially onto the capsule 29 and fixed by flanging on the annular plate 33 fastened on the valve housing 10.

Figure 2:
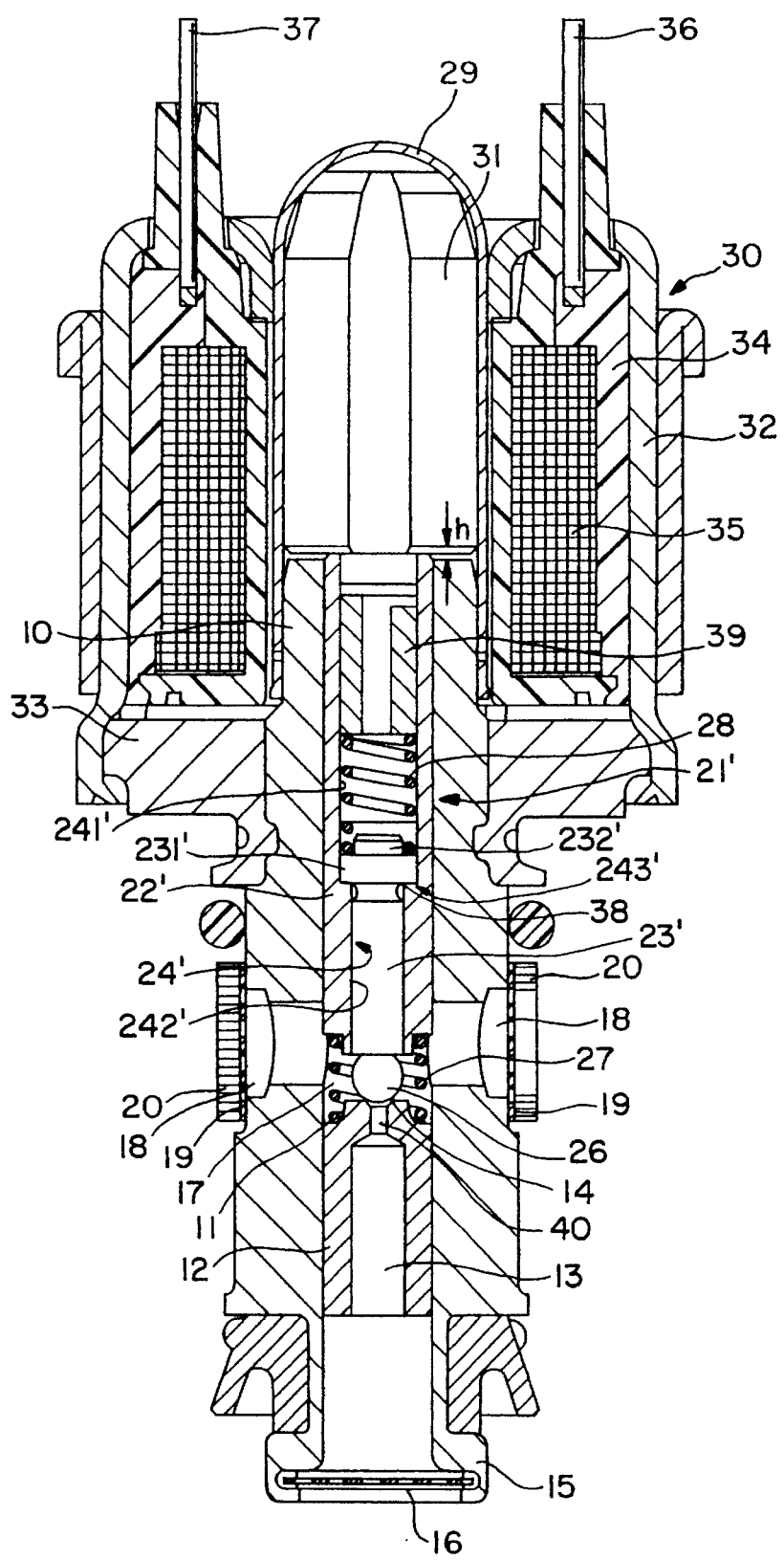

The solenoid valve represented in longitudinal section in FIG. 2 largely coincides with the solenoid valve according to FIG. 1, described above, and is modified only with regard to the valve tappet 21. To the extent to which components in the two solenoid valves of FIGS. 1 and 2 coincide, they have therefore been provided with the same reference numerals.

Here too, the valve tappet 21 is subdivided into two tappet elements 22' and 23', which are coaxial and axially displaceable in relation to each other. The tappet element 22' has in turn a stepped bore 24' with two bore sections 241' and 242' of different bore diameter, but in contrast to FIG. 1 the bore section 242' of smaller diameter is formed in the front part of the tappet element 22', facing the valve body 12, and the bore section 241' of larger diameter is formed in the rear part of the tappet element 22', facing the armature 31. The tappet element 23' is of an identical design to that in FIG. 1 and is guided axially displaceably in the bore section 242' having the smaller inside diameter. On the other hand, its annular collar 231', formed on the rear end, lies in the bore section 241' of larger diameter and is pressed by the pressure-limiting spring 28, likewise arranged there, against the annular shoulder 243', now forming the stop 38, at the transition of the two bore sections 241' and 242'. The pressure-limiting spring 28 is in turn supported against the annular collar 231', it being centred by the section 232' of the tappet element 23' projecting beyond the annular collar 231'. Its abutment is formed by a roll body 39, which is press-fitted into the bore section 241' having the larger bore diameter. The bias of the pressure-limiting spring 28, and consequently its closing force, is determined by the position of the roll body 39 in the tappet element 22.

The remaining design and also the mode of operation of the solenoid valve according to FIG. 2 as well as its putting together in forward assembly is identical to that described with respect to FIG. 1, so that to this extent one is referred to the descriptions above.

The foregoing relates to a preferred exemplary embodiment of the invention, it being understood that other variants and embodiments thereof are possible within the spirit and scope of the invention, the latter being defined by the appended claims.

I claim:

1. A solenoid valve with a pressure limitation for motor vehicle brake systems with slip control, having a valve seat (14) formed on a valve body (12) which is fitted in a sleeve-like valve housing (10), said valve seat (14) surrounding a valve opening (40) of said valve body (12), a valve element (26) with said valve seat for releasing and closing the valve opening (40), said valve element forms a portion of an axially displaceable valve tappet (21; 21') and is held in a valve-open position by a restoring spring (27), having an electromagnet (30), acting on the valve tappet (21; 21'), for transferring the valve element (26) into the valve-closed position and having a pressure-limiting spring (28), acting in the valve-closed position, for predetermining a valve-opening pressure, the valve tappet (21; 21') is subdivided into first and second tappet elements (22, 23; 22', 23') which are coaxial to each other and relatively displaceable, of which the second tappet element (23; 23') supports the valve element (26) and the first tappet element (22; 22') can be driven by the electromagnet (30), and the pressure-limiting spring (28) is arranged between the first and second tappet elements (22, 23; 22', 23'), and supported axially against the second tappet element (23, 23'), said first tappet element (22; 22') is of an at least partially hollow-cylindrical design and is guided axially displaceably in the valve housing (10), the second tappet element (23; 23') that supports the valve element (26) is guided axially displaceably in the hollow-cylindrical first tappet element (22; 22'), the restoring spring (27) is supported between the valve body (12) and the hollow-cylindrical first tappet element (22; 22') and brings the first tappet element to bear against an armature (31) of the electromagnet (30) and the pressure-limiting spring (28), acting between the first and second tappet elements (22, 23; 22', 23'), brings the second tappet element (23; 23') bearing the valve element (26) to bear against a stop means (38), the bearing surface for the pressure-limiting spring (28) is formed by an annular shoulder (243) at a transition of two hollow-cylindrical sections (241, 242) with different inside diameters in the hollow-cylindrical first tappet element (22) and in that the tappet guide bush (25), with the second tappet element (23) lying inside, and the pressure-limiting spring (28) are arranged in the hollow-cylindrical section (241) having the larger inner diameter.

2. A valve according to claim 1, in which the second tappet element (23'), bearing the valve element (26), includes a radially projecting annular collar (231; 231') and in that the stop means (38) on the hollow-cylindrical first tappet element (22') protrudes into the path of displacement of the annular collar (231; 231').

3. A valve according to claim 2, in which the stop means (38) on the hollow-cylindrical first tappet element (22') is formed by an annular shoulder (243') at a transition of two hollow-cylindrical sections (241', 242') having different inner diameters in the hollow-cylindrical first tappet element (22') and in that the second tappet element (23') bearing the valve element (26) is guided in the hollow-cylindrical section (242') having the smaller inside diameter, and the annular collar (231') of the second tappet element (23'), bearing the valve element (26), and also the pressure-limiting spring (28) are arranged in the hollow-cylindrical section (241') having the larger inside diameter.

4. A valve according to claim 3, in which the bearing surface for the pressure-limiting spring (28) is formed by a roll body (39) inserted in the hollow-cylindrical section (241') having the larger inside diameter.

5. A valve according to claim 2, in which the pressure-limiting spring (28) is designed as a helical compression spring which is supported against the annular collar (231; 231') of the second valve tappet (23; 23'), bearing the valve element (26), and against a bearing surface (243; 39') in the hollow-cylindrical second tappet element (22; 22').

6. A valve according to claim 5, in which the bearing surface for the pressure-limiting spring (28) is formed by a roll body (39) inserted in the hollow-cylindrical section (241') having the larger inside diameter.

7. A solenoid valve with a pressure limitation for motor vehicle brake systems with slip control, having a valve seat (14) formed on a valve body (12) which is fitted in a sleeve-like valve housing (10), said valve seat (14) surrounding a valve opening (40) of said valve body (12), a valve element (26) interacts with said valve seat for releasing and closing the valve opening (40), said valve element forms a portion of an axially displaceable valve tappet (21; 21') and is held in a valve-open position by a restoring spring (27), having an electromagnet (30), acting on the valve tappet (21; 21'), for transferring the valve element (26) into the valve-closed position and having a pressure-limiting spring (28), acting in the valve-closed position, for predetermining a valve-opening pressure, the valve tappet (21; 21') is subdivided into first and second tappet elements (22, 23; 22', 23') which are coaxial to each other and relatively displaceable, of which the second tappet element (23; 23') supports the valve element (26) and the first tappet element (22; 22') can be driven by the electromagnet (30), and the pressure-limiting spring (28) is arranged between the first and second tappet elements (22, 23; 22', 23'), and supported axially against the second tappet element (23, 23'), said first tappet element (22; 22') is of an at least partially hollow-cylindrical design and is guided axially displaceably in the valve housing (10), the second tappet element (23; 23') that supports the valve element (26) is guided axially displaceably in the hollow-cylindrical first tappet element (22; 22'), the restoring spring (27) is supported between the valve body (12) and the hollow-cylindrical first tappet element (22; 22') and brings the first tappet element to bear against an armature (31) of the electromagnet (30) and the pressure-limiting spring (28), acting between the first and second tappet elements (22, 23; 22', 23'), brings the second tappet element (23; 23') bearing the valve element (26) to bear against a stop means (38), the stop means (38) is formed by an annular end face of a tappet guide bush (25) press-fitted into said first tappet element, said guide bush is guided axially displaceably in the valve housing (10) by a radially projecting annular collar (251) protruding out of the hollow-cylindrical first tappet element (22), and the bearing surface for the pressure-limiting spring (28) is formed by an annular shoulder (243) at a transition of two hollow-cylindrical sections (241, 242) with different inside diameters in the hollow-cylindrical first tappet element (22) and in that the tappet guide bush (25), with the second tappet element (23) lying inside, and the pressure-limiting spring (28) are arranged in the hollow-cylindrical section (241) having the larger inner diameter.

8. A valve according to claim 7, in which the pressure-limiting spring (28) is designed as a helical compression spring which is supported against the annular collar (231; 231') of the second valve tappet (23; 23'), bearing the valve element (26), and against a bearing surface (243; 39') in the hollow-cylindrical second tappet element (22; 22').

9. A valve according to claim 8, in which the bearing surface for the pressure-limiting spring (28) is formed by a roll body (39) inserted in the hollow-cylindrical section (241') having the larger inside diameter.

10. A solenoid valve with a pressure limitation for motor vehicle brake systems with slip control, having a valve seat (14), surrounding a valve opening (40), said valve seat (14) is formed on a valve body (12) which is press-fitted in a sleeve-like valve housing (10), and a valve element (26) interacts with the said valve seat for releasing and closing the valve opening (40), said valve element forms a portion of an axially displaceable valve tappet (21') and is held in a valve-open position by a restoring spring (27), having an electromagnet (30), acting on the valve tappet (21'), for transferring the valve element (26) into the valve-closed position and having a pressure-limiting spring (28), acting in the valve-closed position, for predetermining a valve-opening pressure, the valve tappet (21') is subdivided into first and second tappet elements (22', 23') which are coaxial to each other and relatively displaceable, of which the second tappet element (23; 23') supports the valve element (26) and the first tappet element (22; 22') can be driven by the electromagnet (30), and the pressure-limiting spring (28) is arranged between the first and second tappet elements (22, 23; 22', 23'), and supported axially against the second tappet element (23, 23'), the first tappet element (22; 22'), which can be driven by the electromagnet (30), is of an at least partially hollow-cylindrical design and is guided axially displaceably in the valve housing (10), the second tappet element (23; 23') that supports the valve element (26) is guided axially displaceably in the hollow-cylindrical first tappet element (22; 22'), the restoring spring (27) is supported between the valve body (12) and the hollow-cylindrical first tappet element (22; 22') and brings said hollow-cylindrical first tappet element to bear against an armature (31) of the electromagnet (30) and the pressure-limiting spring (28), acting between the first and second tappet elements (22, 23; 22', 23'), brings the second tappet element (23; 23') bearing the valve element (26) to bear against a stop means (38) provided on the hollow-cylindrical first tappet element (22; 22'), the second tappet element (23; 23'), bearing the valve element (26), includes a radially projecting annular collar (231; 231') and in that the stop means (38) on the hollow-cylindrical first tappet element (22; 22') protrudes into the path of displacement of the annular collar (231; 231'), the stop means (38) on the hollow-cylindrical first tappet element (22') is formed by an annular shoulder (243') at a transition of two hollow-cylindrical sections (241', 242') having different inner diameters in the hollow-cylindrical first tappet element (22') and in that the second tappet element (23') bearing the valve element (26) is guided in the hollow-cylindrical section (242') having the smaller inside diameter, and the annular collar (231') of the second tappet element (23'), bearing the valve element (26), and also the pressure-limiting spring (28) are arranged in the hollow-cylindrical section (241') having the larger inside diameter, the pressure-limiting spring (28) is designed as a helical compression spring which is supported against the annular collar (231') of the second valve tappet (23'), bearing the valve element (26), and against a bearing surface (243') in the hollow cylindrical second tappet element (22'), and the bearing surface for the pressure-limiting spring (28) is formed by a roll body (39) inserted in the hollow-cylindrical section (241) with a diameter of the hollow-cylindrical first tappet element (21! ) with the second tappet element (23) lying inside said hollow cylindrical section (242') of a smaller inner diameter, and the pressure-limiting spring (28) is arranged in the hollow-cylindrical section (241') having the larger inner diameter.

11. A valve according to claim 10, in which the bearing surface for the pressure-limiting spring (28) is formed by a roll body (39) inserted in the hollow-cylindrical section (241') having the larger inside diameter.

12. A valve according to claim 10, in which the surface bearing for the pressure-limiting spring (28) is formed by a roll body (39) inserted in the hollow-cylindrical section (241') having the larger inside diameter.

13. A solenoid valve with a pressure limitation for motor vehicle brake systems with slip control, having a valve seat (14) formed on a valve body (12) which is fitted in a sleeve-like valve housing (10), said valve seat (14) surrounding a valve opening (40) of said valve body (12), a valve element (26) interacts with said valve seat for releasing and closing the valve opening (40), said valve element forms a portion of an axially displaceable valve tappet (21; 21') and is held in a valve-open position by a restoring spring (27), having an electromagnet (30), acting on the valve tappet (21; 21'), for transferring the valve element (26) into the valve-closed position and having a pressure-limiting spring (28), acting in the valve-closed position, for predetermining a valve-opening pressure, the valve tappet (21; 21') is subdivided into first and second tappet elements (22 23; 22', 23') which are coaxial to each other and relatively displaceable, of which the second tappet element (23; 23') supports the valve element (26) and the first tappet element (22; 22') can be driven by the electromagnet (30), and the pressure-limiting spring (28) is arranged between the first and second tappet elements (22, 23; 22', 23'), and supported axially against the second tappet element (23, 23'), said first tappet element (22; 22') is of an at least partially hollow-cylindrical design and is guided axially displaceably in the valve housing (10), the second tappet element (23; 23') that supports the valve element (26) is guided axially displaceably in the hollow-cylindrical first tappet element (22; 22'), the restoring spring (27) is supported between the valve body (12) and the hollow-cylindrical first tappet element (22; 22') and brings the first tappet element to bear against an armature (31) of the electromagnet (30) and the pressure-limiting spring (28), acting between the first and second tappet elements (22, 23; 22', 23'), brings the second tappet element (23; 23') bearing the valve element (26) to bear against a stop means (38), said stop means (38) for the second tappet element (23) bearing the valve element (26) is formed by an annular end face of a tappet guide bush (25) press-fitted into said first tappet element, said guide bush is guided axially displaceably in the valve housing (10) by a radially projecting annular collar (251) protruding out of the hollow-cylindrical first tappet element (22), said pressure-limiting spring (28) is designed as a helical compression spring which is supported against an annular collar (231; 231') of the second valve tappet (23; 23'), bearing the valve element (26), and against a bearing surface (243; 39') in the hollow-cylindrical second tappet element (22; 22'), said bearing surface for the pressure-limiting spring (28) is formed by an annular shoulder (243) at a transition of two hollow-cylindrical sections (241,242) with different inside diameters in the hollow-cylindrical first tappet element (22) and in that the tappet guide bush (25), with the second tappet element (23) lying inside, and the pressure-limiting spring (28) are arranged in the hollow-cylindrical section (241) having the larger inner diameter.

* * * * *